Sept. 7, 1965  J. M. MILLIGAN  3,204,700
HELICOPTER ROTOR HUBS
Filed June 22, 1962  4 Sheets-Sheet 3
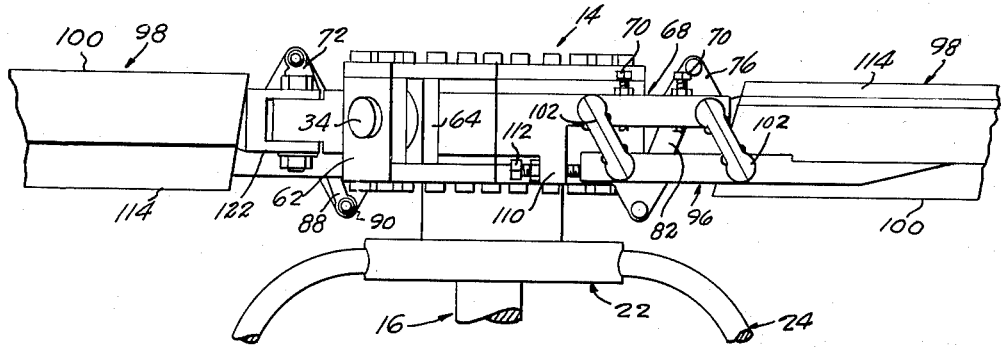
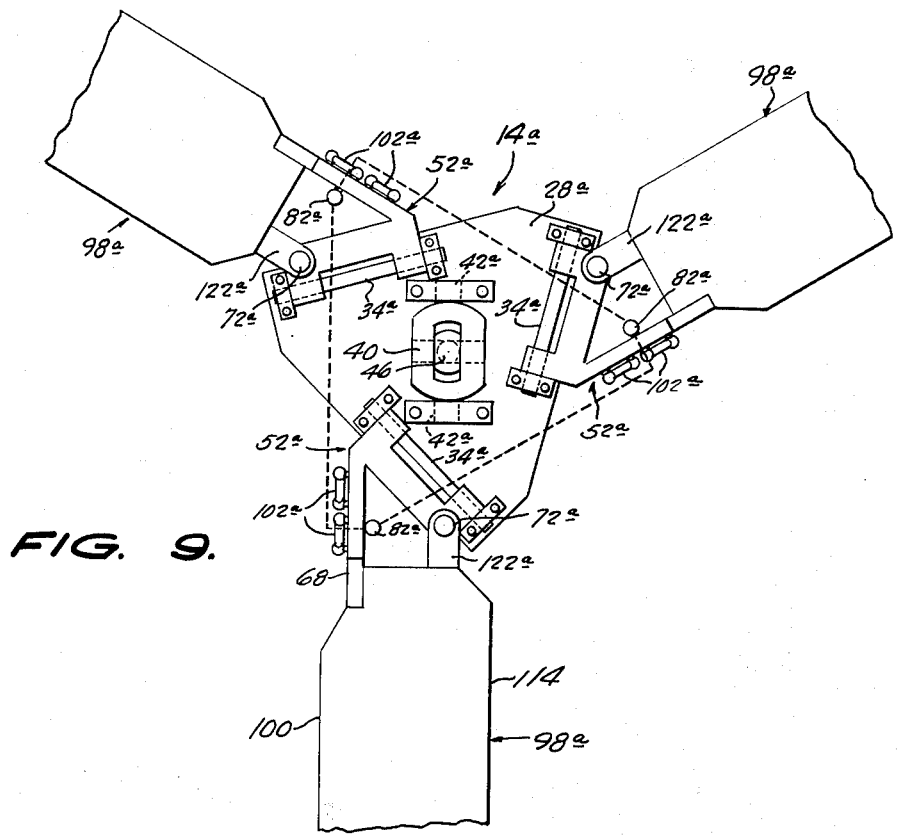
INVENTOR.
JAMES M. MILLIGAN,
BY
McMorrow, Berman & Davidson
ATTORNEYS.

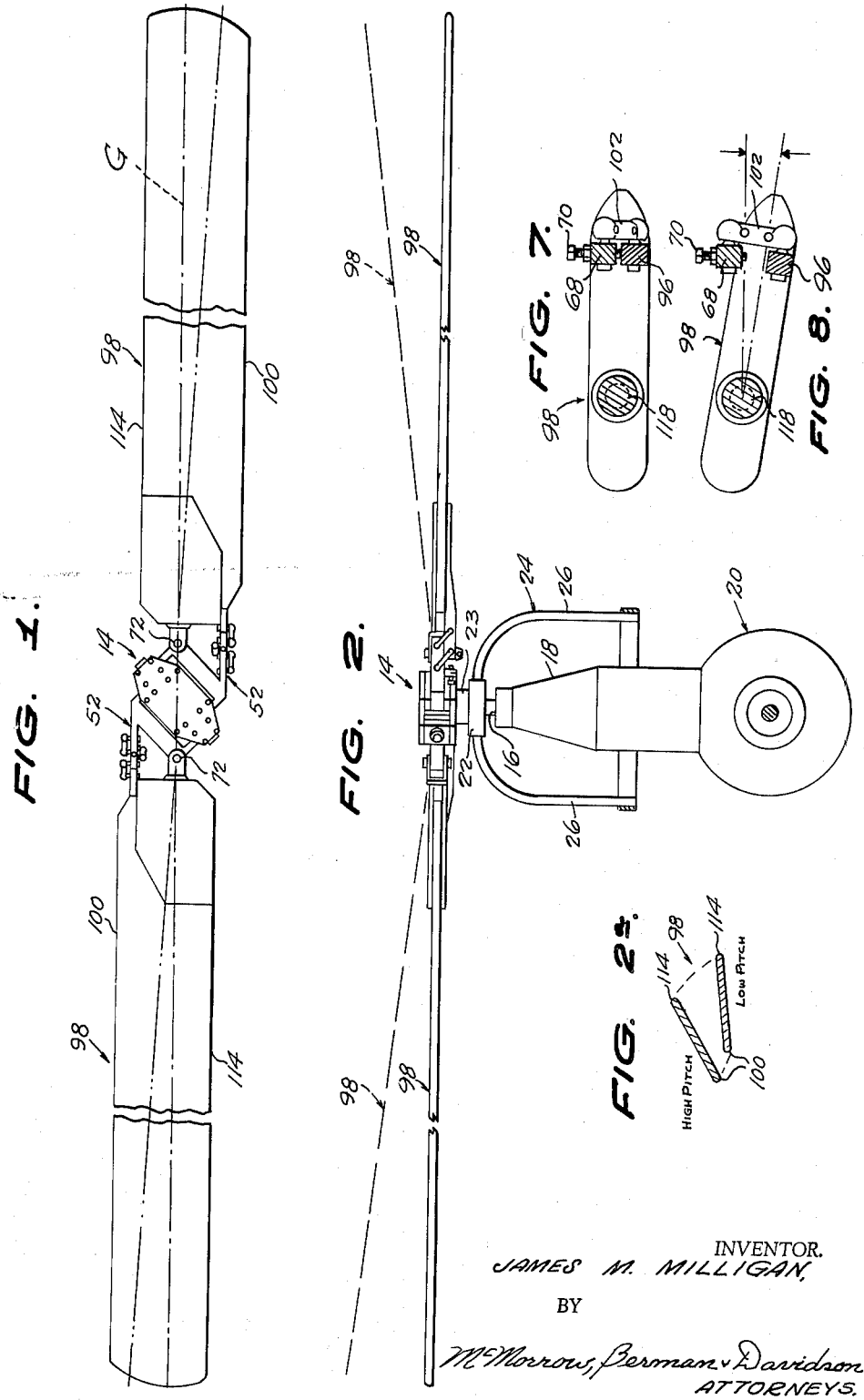

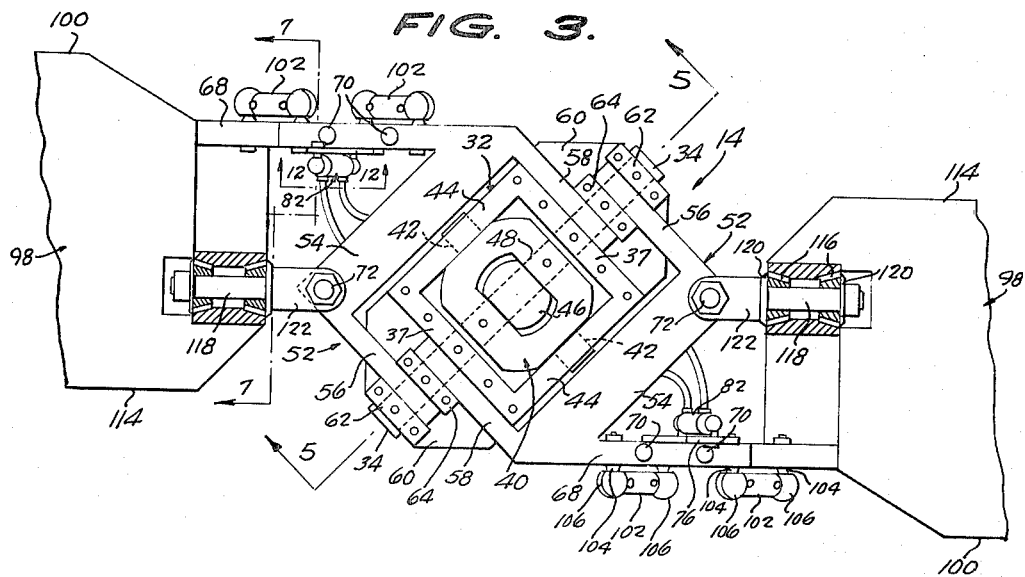
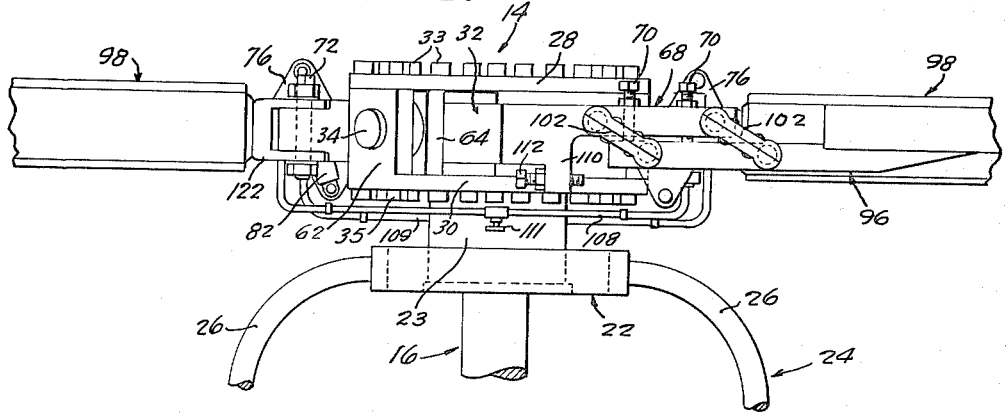
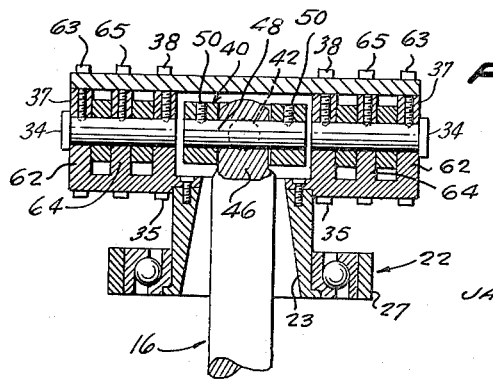

Sept. 7, 1965  J. M. MILLIGAN  3,204,700
HELICOPTER ROTOR HUBS

Filed June 22, 1962  4 Sheets-Sheet 4

INVENTOR.
JAMES M. MILLIGAN,
BY

McMorrow, Berman + Davidson
ATTORNEYS.

United States Patent Office 3,204,700
Patented Sept. 7, 1965

3,204,700
HELICOPTER ROTOR HUBS
James M. Milligan, 1614 Knight St., P.O. Box 750, Helena, Mont.
Filed June 22, 1962, Ser. No. 204,584
10 Claims. (Cl. 170—160.16)

This invention relates to novel helicopter rotor hubs.

The primary object of the invention is the provision of generally improved hubs of the kind indicated which assure safer operation of helicopters by reason of the fact that the hubs automatically produce collective and coordinated pitch changes of their blades for autorotation in the event that the driving engine fails or is shut down, thereby preventing uncontrolled falling of helicopters in such events, and eliminating the hazards of pilot reaction time, in such events, for assumption of autorotation. This is accomplished by making the helicopter blades furnish to the driving engine a substantially constant load under all normal flying conditions, using for collective pitch control only those forces inherent in the rotating blades. To this end, centrifugal force is balanced against the lift of the blades. In the event of engine failure, the blades are made to automatically assume correct pitch for autorotation by producing a second range of blade pitches, so as to establish a different relationship between lift and the centrifugal force exerted by the blades, and by taking advantage of the reversal in torque between the hub and the blades, which occurs as the engine fails and the blades drive the hub. In this, blade drag is balanced against the centrifugal force, and blade inertia assists the shift in blade pitch.

Another object of the invention is the provision of hubs of the character indicated above which are more reliable and durable, by reason of being composed of a small number of simple, rugged, and easily manufactured and assembled parts, the hubs being of open and easily inspected and serviced forms.

A further object of the invention is the provision of hubs of the character indicated above, which can accommodate various numbers of blades, and can be used to form constant speed propellers for conventional airplanes, the automatic actions of the hubs providing for constant and continuous variations in the pitches of the blades, for the maintenance of the best angle of attack of the blades under varying conditions of flight.

Other important objects and advantageous features of the invention will be apparent from the following description and the accompanying drawings, wherein, for purposes of illustration only, specific forms of the invention are set forth in detail.

In the drawings:

FIGURE 1 is a top plan view of a helicopter rotor hub in accordance with the present invention, equipped with two blades;

FIGURE 2 is a side elevation of FIGURE 1, showing the blades in depressed condition or high pitch in full lines and in elevated condition or low pitch in phantom lines;

FIGURE 2a is a schematic sectional view, showing high pitch and low pitch ranges of a blade;

FIGURE 3 is an enlarged fragmentary top plan view of FIGURE 2, partly broken away and in section, and with the top plate of the hub removed;

FIGURE 4 is a fragmentary side elevation of FIGURE 3, showing the blades in low pitch positions;

FIGURE 5 is a vertical transverse section taken on the line 5—5 of FIGURE 3;

FIGURE 6 is a view like FIGURE 4, showing the blades in high pitch positions;

FIGURE 7 is a vertical transverse section taken on the line 7—7 of FIGURE 3, showing the related blade in low pitch position;

FIGURE 8 is a view like FIGURE 7, showing the said blade in high pitch position;

FIGURE 9 is a fragmentary top plan view of another embodiment of the invention, involving three blades;

Figure 10:
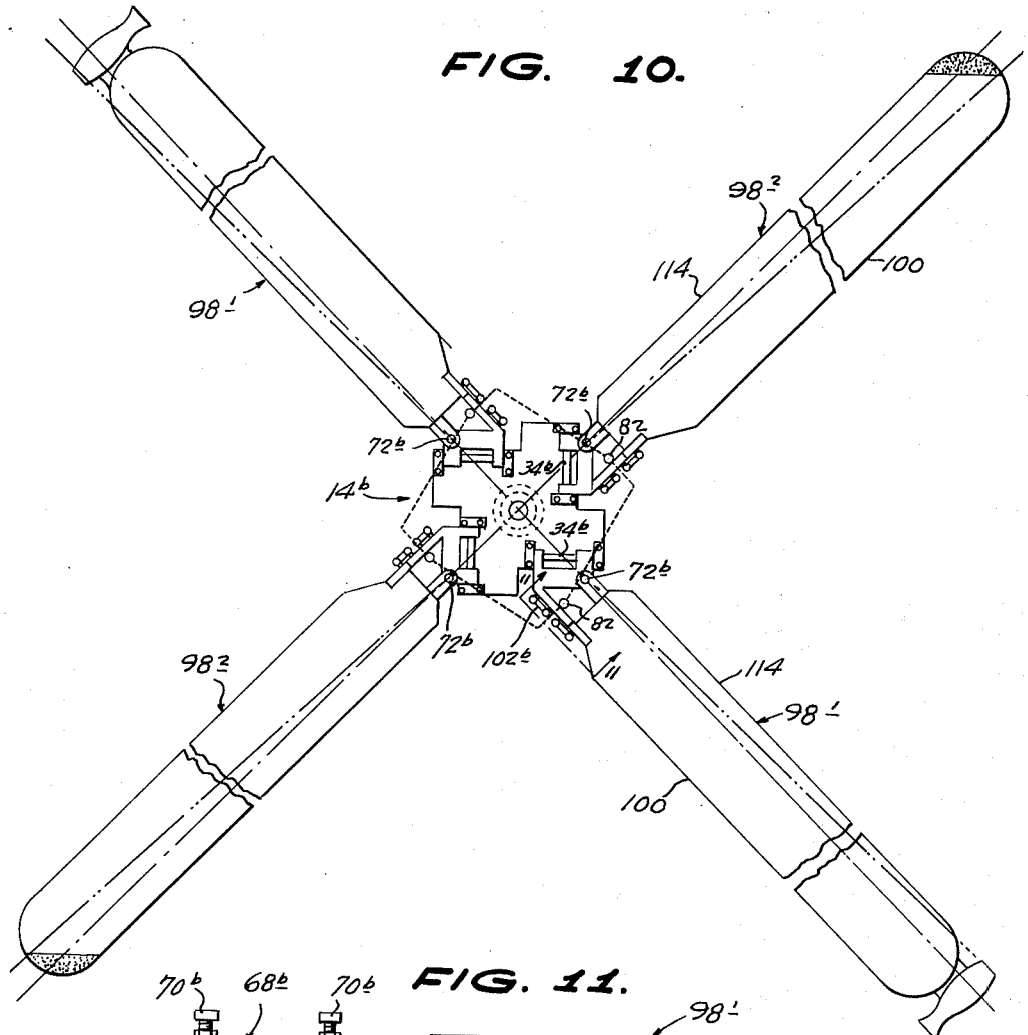
FIGURE 10 is a top plan view of a further embodiment of the invention, involving two opposed jet-driven blades and two opposed drag blades.

Referring in detail to the drawings, wherein like and related numerals designate like and related parts throughout the several views, and first to FIGURES 1 through 8, the hub therein shown and generally designated 14 is mounted on a vertical drive shaft 16, upstanding from a column 18 on an engine 20, the shaft being surrounded by an annular bearing 22, fixed to an annular support 23 which is secured to the hub and through which the shaft 16 loosely and freely extends. A control yoke 24 has arms 26 secured to opposite sides of the outer race 27 of the bearing 22, for tilting the hub 14 relative to the axis of the drive shaft 16.

The hub 14 comprises a top plate 28 and a bottom plate 30, which are spaced and connected by an open rectangular frame 32 secured thereto by means of upper and lower bolts 33 and 35, respectively. The frame 32 has end members 37 through which headed pins 34 extend and are locked in place by means of set screws 38 extending downwardly through the upper plate 28 and indenting the pins 34, as shown in FIGURE 5. Spaced outer and inner lugs 62 and 64 extend between the upper and lower plates, are spaced from the frame end members 37, and are traversed by the pins 34, and set screws 63 and 65 extend downwardly through the upper plate and are threaded in the lugs 62 and 64, against the pins 34.

A drive ring 40 is disposed in the aperture of the hub frame 32 and has pins 42, on its ends, which are journaled in the side members 44 thereof, and are disposed at right angles to the pins 34. The drive shaft 16 has a reduced and flattened terminal 46, on its upper end, which is engaged in the opening of the ring 40, and is traversed by a pin 48, in line with the pins 34, and is locked to the ring 40, as indicated at 50.

A pair of reversed, opposed and interdigitated, U-shaped yokes 52 each have a cross member 54, at whose ends are parallel leading and trailing arms 56 and 58, respectively, disposed along the end members 47 of the frame 32, which are journaled, at their free ends, on the pins 34.

As shown in FIGURE 3, the leading arm 56 of one yoke is positioned between the outer lug 62 and the inner lug 64, and its trailing arm 58 is positioned between the inner lug 64 and an end member 37 of the frame 32. The leading arm 56 of the other yoke is positioned between the related outer and inner lugs 62 and 64, and its trailing arm 58 between the other end member 37 of the frame 32 and the related inner lug 64.

Figure 12:
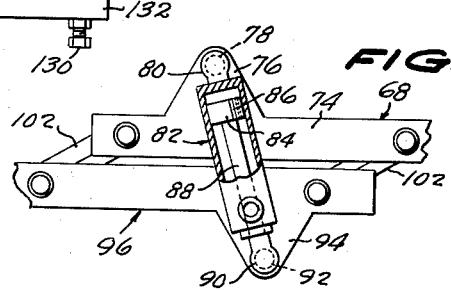
FIGURE 12 is a fragmentary elevation, partly broken away and in section, showing a hydraulic cylinder arrangement common to all herein disclosed embodiments of the invention.

The yokes 52 have single 45° angled horizontal upper legs 68 extending longitudinally and parallel from the opposite ends of their cross members 54, downwardly through which are threaded longitudinally spaced vertical stop screws 70. Perpendicular vertical pivot bolts 72 extend through the other ends of the yoke cross members 54. As shown in FIGURE 12, plates 74, fixed to the laterally inward side of the legs 68 have upwardly extending extensions 76 on which are lateral balls 78 which are embraced by ball sockets 80, on the upper ends of closed hydraulic equalizing cylinders 82. The cylinders contain pistons 84, vented, or having bleeding passages therethrough as indicated at 86, whose piston rods 88 work through the lower ends of the cylinders and have ball sockets 90 which embrace lateral balls 92 on downward extensions 94 of lower legs 96. The lower legs 96 are disposed beneath and extend along the upper legs 68, and are fixed to the undersides of rotor blades 98, at locations adjacent to and parallel to the trailing edges 100 of the blades. Links 102 extend between the upper legs 68 and the lower legs 96 and have ball sockets 104 which embrace lateral balls 106, on the outer sides of the legs. The hydraulic cylinders 82 are connected by fluid transfer lines 108 and 109 which enter the cylinders at locations above and below their pistons 84, whereby movements of the piston of one cylinder are transferred to the other cylinder, to move its piston in the same direction to the same degree. The vertical stop screws 70 serve to limit upward movements of the lower legs 96 toward the upper legs 68. An adjustable flow-restricting valve 111 is incorporated in the line 108.

At their longitudinally inward ends, the upper legs 68 have downwardly extending lugs 110, through which are threaded horizontal stop screws 112, which limit longitudinally inward movements of the lower legs 96, relative to the upper legs.

At similar locations adjacent to the leading edges 114 of the rotor blades 98 are mounted longitudinal spaced horizontal thrust bearings 116 through which are journaled shafts 118, which parallel the legs 68 and 96, and have heads 120 which bear against the remote ends of the bearings 116. Clevises 122, on the longitudinally inward ends of the shafts 118 embrace the cross members 54 of the yokes 52 and are journaled on the pivot bolts 72. As a result, the rotor blades 98 are permitted limited rotations, in opposite directions, on their longitudinal centers of gravity, indicated at "G" in FIGURE 1, on the axis of the shaft 118, as well as vertical angulations, on the axes of the pins 34 and 48, relative to the horizontal, as indicated in full and in phantom lines in FIGURES 2 and 2a, for the purpose hereinafter set forth.

In operation, the drive shaft 16 turns the drive ring 40 through pin 48 which in turn drives the hub through the pins 42. Motion about these two sets of pins constitutes a universal action so that the plane of rotation of the hub need not be perpendicular to the shaft 16. This plane of rotation is controlled by the plane of the control bearing 22. The inner race of the bearing is rigidly attached to the bottom plate of the hub through the bearing support 23. The outer race 27 is held in the yoke 24 which may be tilted by the pilot in any direction. This may be considered to be the cyclic pitch control. The blades 98 are fastened to the yokes 52 by the leg assemblies (68 and 96, links 102) and by the clevis assembly 122. The yokes are in turn fastened to the hub body by the pins 34 and are free to pivot on these pins several degrees both above and below the plane of the hub. These pins 34 are set at a predetermined angle relative to the longitudinal axis of the blade so that as the blade is raised, its pitch relative to the plane of rotation is decreased. As the blade is lowered its pitch increases. It can thus be seen that the coning angle of the blades determines the collective pitch and that the angle formed by pins 34 and the longitudinal axis of the blades determines the degree of pitch change relative to the degree of coning angle change. The magnitude of centrifugal force depends on the blade weight, blade radius and speed of rotation. Lift is dependent on air foil section, angle of attack relative to the air stream, and air speed. Drag is dependent on blade airfoil section, angle of attack relative to the air stream, and air speed. To double the air speed, the speed of rotation must be doubled. Lift, drag, and centrifugal force go up by 4 in this case, assuming a constant angle of attack. Thus, lift, drag, and centrifugal force are in direct proportion to each other. The airfoil section chosen for the blades might have a lift-drag ratio of 20 to 1 at zero degrees pitch. The same section might have a lift-drag ratio of 14 to 1 at plus 8 degrees. It is desirable in the interest of efficiency to operate the blades at the angle of best lift-drag ratio which is assumed to be, in this particular case, zero degrees. It is advantageous to taper the blades in plan and thickness and to twist them so that their roots are at some positive angles with respect to the tip. For the sake of simplicity, it is assumed the blades have no twist. Taking the maximum horse power available at the hub it is possible to figure the maximum r.p.m. at which the given blade can be driven at zero degrees. The maximum lift is figured at this r.p.m. Since this lift is figured at the angle of best lift drag ratio it represents the maximum gross weight which can be lifted vertically under conditions of no wind. Centrifugal force at this r.p.m. is calculated. With lift trying to cone the blades to the degree of zero lift and centrifugal force trying to reduce the coning angle to zero degrees, it is obviously impossible for the blades to be at either extreme and they must assume some intermediate degree of cone. This coning angle is figured and the roots of the blades attached to the yokes at such angles, that, when the blades are in their driven pitch range and coned upward to the calculated degree, their tips are at zero degrees relative to the plane of rotation. Taking the minimum gross weight of the helicopter (light pilot, partial load of fuel and the helicopter itself) it will be found that since lift and centrifugal force are in direct proportion, the helicopter will be lifted off the ground with the coning angle the same as under conditions of maximum load, but, at a lower r.p.m. Thus the blades operate at their best lift drag ratio. This leaves horsepower available for climb. The theoretical rate of climb is calculated. With the maximum power applied, the coning angle will be reduced, thus increasing pitch. This new coning angle is calculated. The pitch increase must be just enough so that the tips of the blades describe a spiral path upward corresponding to the calculated rate of climb. Although the blades now have positive pitch relative to the plane of rotation, they are still at zero degrees relative to the air through which they are moving. There is now a given degree of pitch change for a given degree of coning angle change and the angle between pins 34 and the longitudinal axis of the blades can be determined. The foregoing concerns only hover and vertical climb under conditions of no wind. In level flight, airspeed must be added to the rotational speed of the advancing blades and subtracted from the rotational speed of the retreating blades. The advancing blades now carry more than their share of weight, cone upwardly thereby decreasing pitch, and hence lift. The retreating blades decrease their coning angles thereby increasing their pitch, and hence their lift. It can be seen that this action will cause the helicopter to slide in the direction of the retreating blades. To overcome this, the hub must be tilted slightly toward the side of the advancing blades. Now, in forward flight, if the load is increased, as in a climb, the coning angle will increase, thus decreasing pitch and allowing the engine to maintain its r.p.m. The helicopter will climb, but at the expense of forward speed. If the load is decreased as in a descent, the coning angle will be decreased thereby increasing pitch and loading the engine, holding it to its r.p.m. The excess power will, of course, be translated into forward speed. At high altitude, there is a loss of engine power resulting in a loss of r.p.m., and production of higher coning angle and decreased pitch. However, due to thinner air, there is a loss of lift and loss of drag causing a higher r.p.m. with consequent decrease in coning angle and increase in pitch. These factors result in the proper pitch for the particular altitude and extract the most from the engine. In this discussion, blade twist, parasitic drag, translational lift, tip losses, etc., are not considered, but, of course, these factors enter into the final design.

As hereinabove stated, two ranges of pitch angles are provided for. In one of these ranges the engine-hub assumbly is driving the blades. This is referred to as the driven range. In the other range the engine is disengaged from the hub, as is usual practice, and the blades are in autorotation thus driving the hub and tail rotor as is usual practice. This position is referred to as the autorotational range. In operation, the blades 98 are free to rotate within limits on their longitudinal axes about the shafts 118 thus increasing or decreasing their pitch. They are also free to pivot forward and back within limits about the pins 72. The arms 96 are fastened adjacent to, and parallel to the trailing edges 100 of blades 98 and extend inwardly and beneath the arms 68 which are fastened rigidly to the yokes 52. Arms 96 and 68 are coupled together by the ball and socket links 102. If the blades are caused to move rearwardly in relation to the hub-yoke assembly, the arms 96 are moved inwardly and the links 102 cause the arms 96 and 68 to separate a designed distance. The arms 96 carry the trailing edges of the blades down thus increasing pitch. Further inward and downward movement of the arms 96 is prevented by the adjustable stops 112. It can be seen that adjustments of the stops 112 determine the range of angles over which the coning angle has control. The stops 112 also serve to help adjust one blade to the other for the purpose of tracking the blades in this, the driven range.

If the blades are caused to move forwardly in relation to the hub-yoke assembly, the arms 96 move outwardly and the links 102 cause arms 96 and 68 to collapse together until arrested by adjustable stops 70. Arms 96 carry the trailing edges of the blades up resulting in a decreased pitch. This is the autorotational range. At this low angle the blades will autorotate in the conventional manner. Stops 70 serve to adjust the range of angles over which the coning angle has control and also help to adjust track in the autorotational range. As the blades cone upward, their tips assume negative angles causing an increase in rotor r.p.m.'s and a consequent decrease in their coning angles with consequent increase in pitch, thus slowing rotation. The r.p.m's in autorotation depend on the setting of screws 70, the gross weight, atmospheric density, and the forward speed. Automatic shift from one range to the other is accomplished in the following manner:

The configuration of the hub-blade assembly is such, that when the blades are in autorotational range, a line drawn from the center of the rotor shaft 16 through the center of the pins 72 passes approximately through the center of gravity of the blades 98. Centrifugal force will try to keep these points in line. With the engine driving the hub, the blades produce drag tending to move the blades rearwardly with respect to the hub. The blades also produce centrifugal force tending to line up the aforementioned points. However, with the hub driving the blades, the drag overcomes the centrifugal force and the blades move rearwardly into the driven pitch range. They will remain in this range as long as power is applied and their exact angle of attack will be determined by the coning angle. If the engine should fail or be shut down the blades possess a great amount of inertia. The hub, transmission, and tail rotor assembly possess little inertia by comparison, and, in a very short period of time, present a drag to the blades. This drag, or reversal of torque, in combination with the centrifugal force causes the blades to move ahead with respect to the hub thus going into the autorotational range. From this time on, the blades are driving and the hub presents drag. The blades will stay in this range until power is again applied or an autorotational landing is completed. In the event that the machine is hovering at what is considered a dangerous hovering altitude for a conventional helicopter, say 200 feet, and the engine fails, the blades will cone sharply upwardly, putting the pitch highly negative and increasing rotor r.p.m. tremendously and quickly. If the safety factor of the hub-blade assembly is high enough so that there is no structural failure the machine will descend vertically, but not in a free fall. This gives the pilot a chance to gain some forward speed and make a landing.

To insure that both blades change pitch to the same degree, at the same instant, the hydraulic cylinders 82 are connected as shown and described. The purpose of the vent holes 86 in the pistons is to provide a controlled seepage from one side of the pistons to the other so that there can be no fluid build-up on one side for any reason, which would force the arms 96 off their proper stops. During rapid shift from one pitch to the other this seepage is inconsequential. The adjustable valve 111 in the hydraulic connecting line 108 serves to limit the speed of shift, which should be slow enought to prevent undue shock.

The form of helicopter motor hub shown in FIGURE 9, and generally designated 14$^a$, involves three rotor blades 98$^a$, in an equally circumferentially spaced flared relationship. The coordinated automatic pitch change and coning of the rotor blades hereinabove described applies to the blades 98$^a$. The structure of the hub 14$^a$ is altered relative to the hub 14, only to an extent necessary to accommodate the three blades 98$^a$. To this end, the frames of the rotor are made triangular, and the yokes 52$^a$ are individually pivoted on the upper frame 28$^a$ of the hub on pins 34$^a$, and between upstanding lugs 62$^a$, the pins 34$^a$ being symmetrically located along side edges of the upper frame 28$^a$, adjacent to related corners thereof.

Figure 11:
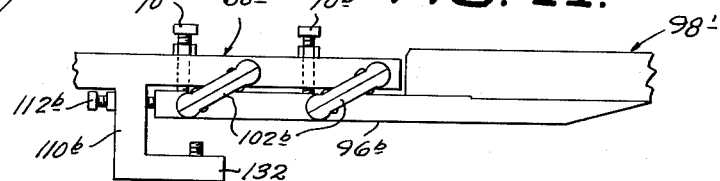
FIGURE 11 is an enlarged fragmentary elevation taken on the line 11—11 of FIGURE 10.

The form of helicopter hub shown in FIGURES 10 and 11, and generally designated 14$^b$, involves two diametrically opposed driving blades 98′ and two diametrically opposed drag blades 98$^2$. The blades are articulated to the hub 14$^b$ in substantially the same manner as in FIGURE 9, with their pins 34$^b$ disposed at right angles to each other and the blades 98$^2$ disposed at 45° angles thereto. The drag blades 98$^2$ have suitable fly-wheel weights 126 on their tips, but are otherwise substantially the same in construction as those hereinabove described. It is to be noted that the angle between the pins 34$^b$ and the blades 98$^2$ can be other than 90°, it being necessary only that the drag blades be diametrically opposed.

The driving blades 98′ have, on their tips, jets 128, positioned substantially at right angles to the lengths of the blades, in horizontal positions, and which discharge from the trailing edges 100 of the driving blades. Any suitable forms of jets are contemplated.

As shown in FIGURE 11, the pendant lugs 110$^b$ on the upper legs 68$^b$ of the yokes 52$^b$, not only carry horizontal stop screws 112, adapted to be engaged by the adjacent ends of the lower legs 96$^b$, but carry also vertical stop screws 130, threaded through horizontal extensions 132, of the lugs 110$^b$ which reach longitudinally outwardly beneath the lower legs 96$^b$. The upper legs 68$^b$ retain the vertical stop screws 70$^b$ of the above described embodiments, for the same purpose.

In operation, and considering the fact that the hub 14$^b$ is free-wheeling and is not driven by a drive shaft, firing of the jets 128 rotates the rotor 14$^b$, so that the drag blades 98$^2$ begin to drag in the air, and this drag is transmitted to the hub. At this time the hub offers some resistance to being rotated, so that the driving blades 98′ turn to high pitch, from low pitch, and the drag blades turn to high pitch, from low pitch. Thereafter, the coning angles of the blades determine the exact angle at which all of the blades are pitched. Nothing in these operations has disturbed the dynamic balance of the blades, although the driving blades have moved in the direction or rotation and the drag blades in the opposite direction. Should the jets 128$^b$ shut down, there remains no driving force for the drag blades 98$^2$. For the moment, all of the blades retain their high pitch, but their centrifugal force takes over and returns all of the blades to low pitch and all four blades are then in autorotation position. Because the hub produces little friction, there is no tendency for the driving blades 98' to move in the direction of rotation of the hub $14^b$ and undesirably move the blades out of autorotation position.

Although there have been shown and described preferred forms of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. A helicopter rotor comprising a vertical rotary drive shaft, a horizontal frame mounted axially on the drive shaft for rotation therewith, said frame having diametrically opposed pivot pins extending therefrom, U-shaped yokes having parallel legs located at opposite sides of the frame and pivoted on related pins, said yokes having cross members extending between the legs of the yokes, said cross members having upper arms extending from one end thereof, said upper arms extending at angles to the axes of the pivot pins, rotor blades having lower arms extending inwardly therefrom, said lower arms being located beneath and extending below the upper arms, means extending between the blades and the other ends of the yoke cross members connecting the blades to the yokes for rotation relative to the yokes on horizontal axes and vertical axes, link means extending between and universally pivoted to the upper and lower arms, motion transferring means operatively connected between the upper and lower arms related to each rotor blade, and means operatively connecting the motion transferring means.

2. A helicopter rotor according to claim 1, wherein a hub surrounds the drive shaft and is pivoted thereon on a horizontal axis, said frame surrounding the hub and being pivoted thereon on a horizontal axis extending at right angles to the pivotal axis of the hub, and stationary support means spacedly surrounding the drive shaft on which the frame is journaled.

3. A helicopter rotor comprising a vertical rotary drive shaft, a horizontal frame surrounding and fixed to the drive shaft, U-shaped yokes having spaced arms and cross members extending between the outer ends of the arms, the arms of the yokes being positioned at opposite sides of the frame and pivoted to the frame on horizontal axes, said cross members having outer ends and inner ends, upper horizontal legs on the outer ends of the cross members and extending outwardly therefrom, said upper legs being disposed at acute angles to the pivotal axis of the yoke legs, rotor blades having lower horizontal legs extending from their inner ends, said lower legs being substantially parallel to the longitudinal centerlines of the blades and at the trailing sides of these centerlines, the lower legs being positioned beneath and extending along the upper legs of the yokes, link means extending between and universally pivoted to related upper and lower legs, members extending inwardly from the inner ends of the rotor blades and positioned at the leading side of the centerlines of the blades, said members having inner ends pivoted to the inner ends of the yoke cross members on vertical axes, said members having outer ends pivoted to the blades at their inner ends on horizontal axes, and motion transfer means operatively connected with the rotor blades.

4. A helicopter rotor according to claim 3, wherein said motion transfer means comprises vertical hydraulic members comprising cylinders having piston rods extending therefrom, the piston rods and the cylinders being severally and universally pivoted to upper and lower legs associated with each rotor blade.

5. A helicopter rotor, a vertical drive shaft, a hub mounted on the shaft for rotation therewith, said hub comprising a horizontal open frame, U-shaped yokes having cross members and parallel arms extending inwardly from the ends of the cross members, means pivoting the arms at their free ends on the frame on axes extending across the frame, blades pivoted on said yokes and radiating therefrom, said yokes having upper horizontal legs extending outwardly therefrom and angled relative to the arms, the blades having inwardly extending lower legs disposed beneath and along the upper legs, universal means connecting the other ends of the cross members to the blades at one side of the legs, link means extending between and pivoted to the legs, hydraulic motion transfer cylinders extending between and pivoted to the legs, and fluid conduit means connected between the cylinders.

6. A helicopter rotor, a vertical drive shaft, a hub mounted on the shaft for rotation therewith, said hub comprising a horizontal open frame, U-shaped yokes having cross members and parallel arms extending inwardly from the ends of the cross members, means pivoting the arms at their free ends on the frame on axes extending across the frame, blades pivoted on said yokes and radiating therefrom, said yokes having upper horizontal legs extending outwardly therefrom and angled relative to the arms, the blades having inwardly extending lower legs disposed beneath and along the upper legs, universal means connecting the other ends of the cross members to the blades at one side of the legs, link means extending between and pivoted to the legs, hydraulic motion transfer cylinders extending between and pivoted to the legs, and fluid conduit means connected between the cylinders, adjustable vertical stop means on the upper legs for the lower legs, adjustable horizontal stop means on the upper legs adapted to be engaged by the inward ends of the lower legs.

7. A helicopter rotor, a vertical drive shaft, a hub mounted on the shaft for rotation therewith, said hub comprising a horizontal open frame, U-shaped yokes having cross members and parallel arms extending inwardly from the ends of the cross members, means pivoting the arms at their free ends on the frame on axes extending across the frame, blades pivoted on said yokes and radiating therefrom, said yokes having upper horizontal legs extending outwardly therefrom and angled relative to the arms, the blades having inwardly extending lower legs disposed beneath and along the upper legs, universal means connecting the other ends of the cross members to the blades at one side of the legs, link means extending between and pivoted to the legs, hydraulic motion transfer cylinders extending between and pivoted to the legs, and fluid conduit means connected between the cylinders, adjustable vertical stop means on the upper legs for the lower legs, adjustable horizontal stop means on the upper legs adapted to be engaged by the inward ends of the lower legs, and additional vertical stop means carried by the upper legs beneath the lower legs and adapted to be engaged by the lower legs.

8. A helicopter rotor comprising a vertical drive shaft, a hub mounted on the shaft for rotation therewith, said hub comprising a horizontal frame, U-shaped yokes having spaced parallel legs and cross members connected between the outer ends of the legs, the inner ends of the yoke legs being pivoted to opposite sides of the frame on horizontal axes extending crosswise of the frame, said yokes having horizontal upper arms extending laterally outwardly from their cross members at one end of the latter at acute angles to the pivotal axes of the legs, rotor blades radiating outwardly from the frame, universal joints connecting the inner ends of the blades to the cross members of the yokes at points spaced along the cross members of the yokes from said upper legs, said blades having inwardly extending lower legs fixed thereto, said lower legs being positioned beneath and extending along the upper legs of the yokes, link means connecting the upper and lower legs together.

9. A helicopter rotor comprising a vertical drive shaft, a hub mounted on the shaft for rotation therewith, said hub comprising a horizontal frame, U-shaped yokes having spaced parallel legs and cross members connected between the outer ends of the legs, the inner ends of the yoke legs being pivoted to opposite sides of the frame on horizontal axes extending crosswise of the frame, said yokes having horizontal upper arms extending laterally outwardly from the cross members at one end of the latter at acute angles to the pivotal axes of the legs, rotor blades radiating outwardly from the frame, universal joints connecting the inner ends of the blades to the cross members of the yokes at points spaced along the cross members of the yokes from said upper legs, said blades having inwardly extending lower legs fixed thereto, said lower legs being positioned beneath and extending along the upper legs of the yokes, link means connecting the upper and lower legs together, and motion transfer means operatively connected between the upper and lower legs of related yokes and blades.

10. A helicopter rotor comprising a vertical drive shaft, a hub mounted on the shaft for rotation therewith, said hub comprising a horizontal frame, U-shaped yokes having spaced parallel legs and cross members connected between the outer ends of the legs, the inner ends of the yoke legs being pivoted to opposite sides of the frame on horizontal axes extending crosswise of the frame, said yokes having horizontal upper arms extending laterally outwardly from their cross members at one end of the latter at acute angles to the pivotal axes of the legs, rotor blades radiating outwardly from the frame, universal joints connecting the inner ends of the blades to the cross members of the yokes at points spaced along the cross members of the yokes from said upper legs, said blades having inwardly extending lower legs fixed thereto, said lower legs being positioned beneath and extending along the upper legs of the yokes, link means connecting the upper and lower legs together, and motion transfer means operatively connected between the yokes comprising vertical hydraulic cylinders extending between and articulated at their upper ends to the upper yoke legs, said cylinders having piston rods extending downwardly therefrom and articulated to the lower legs on the blades, vented pistons on said rods working in the cylinders, and conduit means connecting together related ends of the cylinders in communication.

References Cited by the Examiner

UNITED STATES PATENTS

| | | | |
|---|---|---|---|
| 2,086,802 | 7/37 | Hays | 170—160.56 |
| 2,397,489 | 4/46 | Jenkins | 170—160.56 |
| 2,410,459 | 11/46 | Platt | 170—160.56 |
| 2,495,523 | 1/50 | Hays | 170—160.13 |
| 2,529,479 | 11/50 | Bates | 170—160.25 |
| 2,536,041 | 1/51 | Dorand | 170—160.56 |
| 2,717,043 | 9/55 | Isacco | 170—160.27 X |

FOREIGN PATENTS

| | | |
|---|---|---|
| 129,215 | 11/46 | Australia. |
| 437,521 | 10/35 | Great Britain. |
| 479,461 | 2/38 | Great Britain. |
| 612,189 | 11/48 | Great Britain. |

JULIUS E. WEST, *Primary Examiner.*

FERGUS S. MIDDLETON, ABRAM BLUM, *Examiners.*